(12) United States Patent
Disser

(10) Patent No.: US 6,422,659 B2
(45) Date of Patent: *Jul. 23, 2002

(54) ESTIMATED ELECTRIC CALIPER CLAMP FORCE BASED UPON ACTUATOR MOTOR POSITION

(75) Inventor: Robert John Disser, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/735,598

(22) Filed: Dec. 12, 2000

Related U.S. Application Data
(60) Provisional application No. 60/170,558, filed on Dec. 14, 1999.

(51) Int. Cl.⁷ .............................................. F16D 55/08
(52) U.S. Cl. ..................... 303/20; 188/72.1; 188/158; 188/162; 188/1.11 E; 188/1.11 L
(58) Field of Search ............................ 303/20, 3, 155, 303/115.2, 162; 188/181 T, 158, 156, 165, 162, 72.1, 72.7, 157, 72.8, 161, 163, 1.11 AV; 701/70, 48, 71, 33; 318/139, 370–376, 383, 430–434

(56) References Cited

U.S. PATENT DOCUMENTS

| | | | |
|---|---|---|---|
| 5,320,421 A | | 6/1994 | Kade et al. |
| 5,339,641 A | | 8/1994 | Mathis et al. |
| 5,957,246 A | | 9/1999 | Suzuki |
| 2001/0030462 A1 | * | 10/2001 | Disser .................... 303/20 |

FOREIGN PATENT DOCUMENTS

| WO | 0145245 | * | 6/2001 |
|---|---|---|---|

\* cited by examiner

*Primary Examiner*—Douglas C. Butler
(74) *Attorney, Agent, or Firm*—Scott A. McBain

(57) ABSTRACT

A method and device for controlling an actuator in response to an input signal is provided. The device detects actuator position, calculates a force applied to the actuator as a function of the detected position using a predetermined formula, and responsively produces a force feedback signal. The device receives the input signal and the force feedback signal and responsively delivers to the actuator a control signal.

20 Claims, 4 Drawing Sheets

ESTIMATED ELECTRIC CALIPER CLAMP FORCE BASED UPON ACTUATOR MOTOR POSITION

CROSS-REFERENCE TO RELATED APPLICATIONS

This application claims the benefit of U.S. Provisional Patent Application Serial No. 60/170,558, filed Dec. 14, 1999.

BACKGROUND OF THE INVENTION

1. Field of the Invention

The present invention is related to electronic controls for an actuator and more particularly to a method and apparatus for providing feedback for an electronic controller.

2. Description of Relating Art

Actuators of many types are controlled using feedback control. The control logic may be embodied in analog control circuits or digital controllers. Digital control me be accomplished using many different types of devices, such as programmable logic controllers (PLC) or microprocessor based electronic control modules.

One example of an actuator is a brake caliper of a braking system of a motor vehicle. The brake caliper is actuated by a controller. Typically, an operator instructs the controller to apply the brake through operation of a brake pedal. The force applied by the brake caliper is modulated through modulation of the brake pedal.

Actuation of the brakes may be divided into a plurality of phases, for example, initial application of the brakes or application of the brakes to bring the vehicle to a complete stop, modulation of the brakes to slow the vehicle to a desired speed, and release of the brakes. During the first and last of these phases, it is desirable to apply maximum voltage and current to the actuator (in a forward or reverse direction). During the middle phase, brake force is modulated as a function of brake pedal position.

Feedback is typically provided through a feedback sensor which directly measures the feedback parameter. For example, in brake systems the feedback supplied to the control is the actual force applied to the brakes. Typically, a force transducer is used.

However, the additional sensor adds cost and complexity to the system. The present invention is aimed at one or more of the problems identified above.

BRIEF SUMMARY OF THE INVENTION

In one aspect of the present invention, a controller for controlling an actuator in response to an input signal is provided The controller detects a position of the actuator, calculates a force applied to the actuator as a function of the detected position using a predetermined formula, and responsively produces a force feedback signal. The controller receives the input signal and the force feedback signal and responsively delivers to the actuator a control signal.

In another aspect of the present invention, a method for controlling an actuator in response to an input signal is provided. The method includes the steps of detecting position of the actuator and calculating a force as a function of the detected position using a predetermined formula, and responsively producing a force feedback signal. The method further includes the step of receiving the input signal and the force feedback signal and responsively delivering to the actuator a control signal.

DETAILED DESCRIPTION OF THE INVENTION

Figure 1:
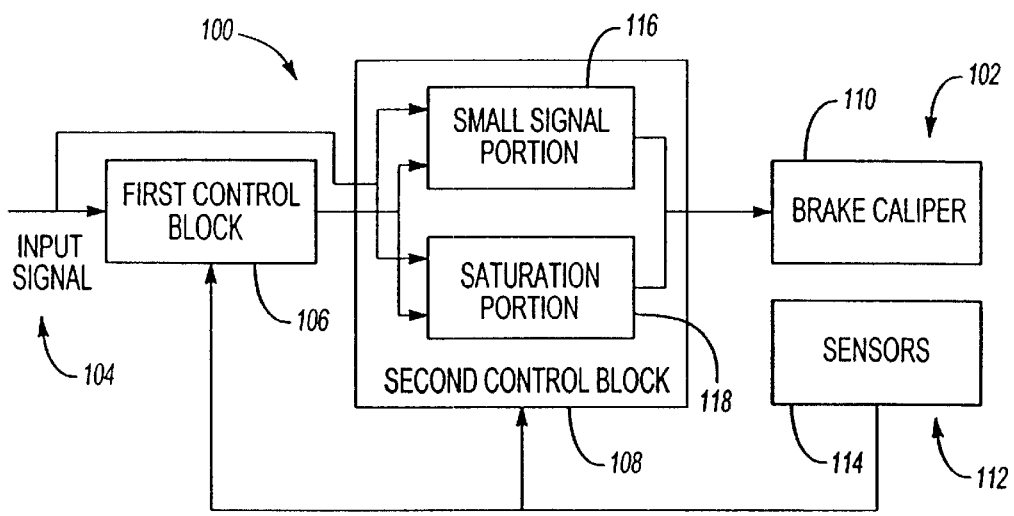
FIG. 1 is a block diagram of a controller having a first control block and a second control block, for an actuator, according to an embodiment of the present invention.

With reference to the drawings and in operation, the present invention provides a controller or device 100 for controlling an actuator 102 in response to an input signal 104. The controller 100 is preferably a digital controller, such as a programmable logic controller (PLC) or a microprocessor based control module. The controller 100 includes a first control block 106 and a second control block 108.

The first control block 106 receives the input signal 104 and detects an operating condition of the input signal 104. The first control block 106 responsively produces an operating condition signal as a function of the input request.

The present invention may be used to control any type of actuator 102. For example, the controller 100 may be used to control a brake caliper 110 of a brake system of a motor vehicle (not shown). The input signal 104 is an indication of the desired braking function, e.g., actuation of a brake pedal by an operator (not shown). The input signal normally has a DC and an AC component.

A sensing means 112 is coupled to the actuator 102 and provides a feedback or sensor signal to the first and second control blocks 106, 108. In one embodiment, the sensing means 112 includes a current sensor or current sensing resistor and an actuator position sensor 114 for sensing the current provided to the actuator 102. As described below, the sensing means 112 uses the sensed current and position as an indication of the force applied to the brakes.

The first control block 106 detects whether the input or request signal 104 signifies operation of the actuator 102 in a small signal mode or in a saturated mode. In the saturated mode, the input signal 104 is indicative of a request for maximum voltage and current to be supplied to the actuator 102. In the case of the brake caliper 110, the saturation mode is typically indicative of initial brake application and reversal of the brake motor. Small signal mode is used to regulate braking force.

As discussed below, the first control block 106 detects the applicable operating mode as a function of the input signal and generates the operating condition signal with a first value if the operating condition of the input signal is in the small signal mode and a second value if the operating condition of the input signal is in the saturated mode.

The second control block 108 includes a small signal portion 116 and a saturation portion 118. The second control block 108 is adapted to receive the input signal and the operating condition signal and responsively deliver a control signal to the actuator 102. As discussed below, the small signal portion 116 and the saturation portion 118 are adapted to produce a small signal control signal and a saturation control signal, respectively, as a function of the input signal. The control signal is equal to the small signal control signal if the operating condition signal is equal to the first value and is equal to the saturation control signal if the operation condition signal is equal to the second value.

Figure 2:
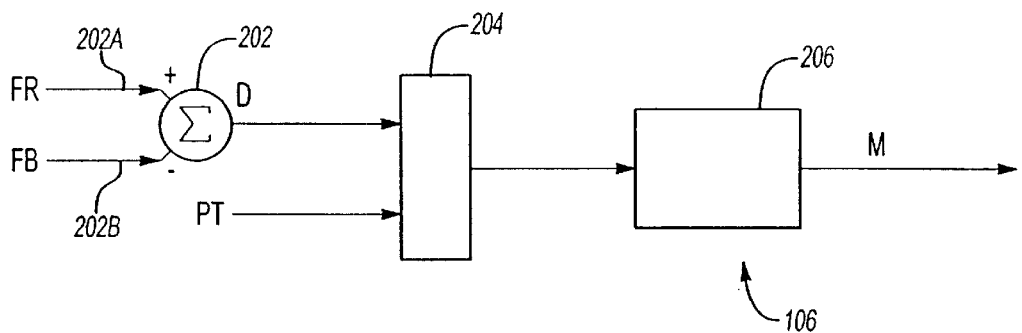
FIG. 2 is a block diagram of the first control block of FIG. 1, according to an embodiment of the present invention.

With reference to FIG. 2, the first control block 106 includes a first summer 202 and a comparator 204. The summer 202 has a positive input 202A and a negative input 202B. The positive input 202A is coupled to the input signal 104 and the negative input 202B is coupled to the feedback signal (FB), i.e., the output of the sensing means 112. In the brake example, the input signal 104 is equal to the force request (FR). The output signal (D) of the first summer 202 is the difference between the input signal and the feedback signal. The difference signal D is compared with a predetermined threshold (PT) in the comparator 204. If the difference signal D is exceeds PT then the controller 100 is operating in the saturation mode. If the difference signal D does not exceed PT then the controller 100 is operating in the small signal mode. The output of the comparator is digital information, i.e., a "0" or a "1". A "1" value is indicative of the saturation mode and a "0" value is indicative of the small signal mode.

An optional filter 206 may be used to transition between the modes.

Figure 3:
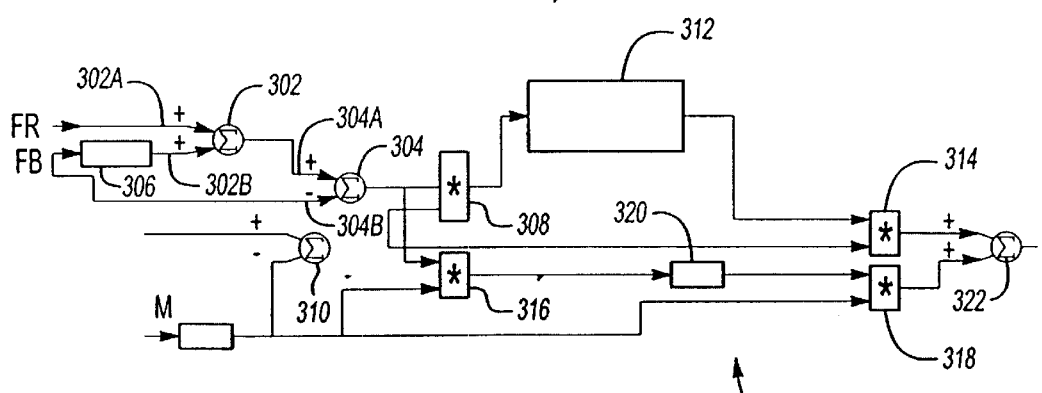
FIG. 3 is a block diagram of the second control block of FIG. 2, according to an embodiment of the present invention.

With reference to FIG. 3, the small signal portion 116 of the second control block 108 includes second and third summers 302, 304. The second summer 302 includes first and second positive inputs 302A, 302B. The first positive input 302A of the second summer 302 is coupled to the input signal 104 (FR). The second positive input 302B of the second summer 302 is coupled to the output of a dither block 306. The dither block 306 adds some dither to keep the actuator 102 in a dynamic state to reduce static friction. As shown, the dither is a function of the feedback FB. The output of the second summer 302 is coupled to a positive input 304A of the third summer 304. A negative input 304B of the third summer 304 is coupled to the feedback signal FB, i.e., the output of the sensing means 112.

The output of the third summer 304 is coupled to an input of a first multiplier 308. A second input of the first multiplier 308 is coupled to the output of a fourth summer 310. A positive input of the fourth summer 310 is coupled to a value of at least 1. A negative input of the fourth summer 310 is coupled to the output (M) of the first control block 106. The output of the first multiplier 308 is coupled to a small signal function 312.

The small signal function 312 preferably includes a filter function, e.g., a La Place equation or a proportional, integral, derivative (PID) function.

The output of the small signal function 312 is coupled to an input of a second multiplier 314. A second input of the second multiplier 314 is coupled to the output M of the first control block 106.

The saturation portion 118 includes third and fourth multipliers 316, 318. The output of the second summer 304 is coupled to an input of the third multiplier 316. A second input of the third multiplier 316 is coupled to the output (M) of the first control block 106. The output of the third multiplier 316 is coupled to a saturation signal function 320. Preferably, the saturation signal function 320 includes a PID function. The output of saturation signal portion control 320 is coupled to an input of the fourth multiplier 318. A second input of the fourth multiplier 316 is coupled to the output (M) of the first control block 106.

The output of the second and fourth multipliers 314, 318 are coupled to inputs of a fifth summer 322. The output of the fourth summer 322 is the control signal delivered to the actuator 102. The first, second, third, and fourth multipliers 308, 314, 316, 318 determine which control function, i.e., the small signal function 310 or the saturation function 320 is actually controlling the actuator 102.

As determined by the first control block 106, if the controller 100 is in the small signal mode, the value of the output (M) of the first control block 106 is zero (0). Thus, the output of the saturation portion 118 of the second control block 108 is also zero (0) as a result of the second and fourth multipliers 316, 318. The output of the second control block 108, which is the control signal sent to the actuator, is thus the output of the small signal function 312.

If the controller 100 is in the saturation mode, the value of the output (M) of the first control block 106 is one (1). Thus, the output of the fourth summer 310 is substantially zero, as is the output of the small signal portion 312 of the second control block 108. The output of the second control block 108 is thus, the output of the saturation function 320.

The actual functions within the small signal function 312 and the saturation function 320 portion are a function of the actuator 102 and application thereof.

Figure 7:
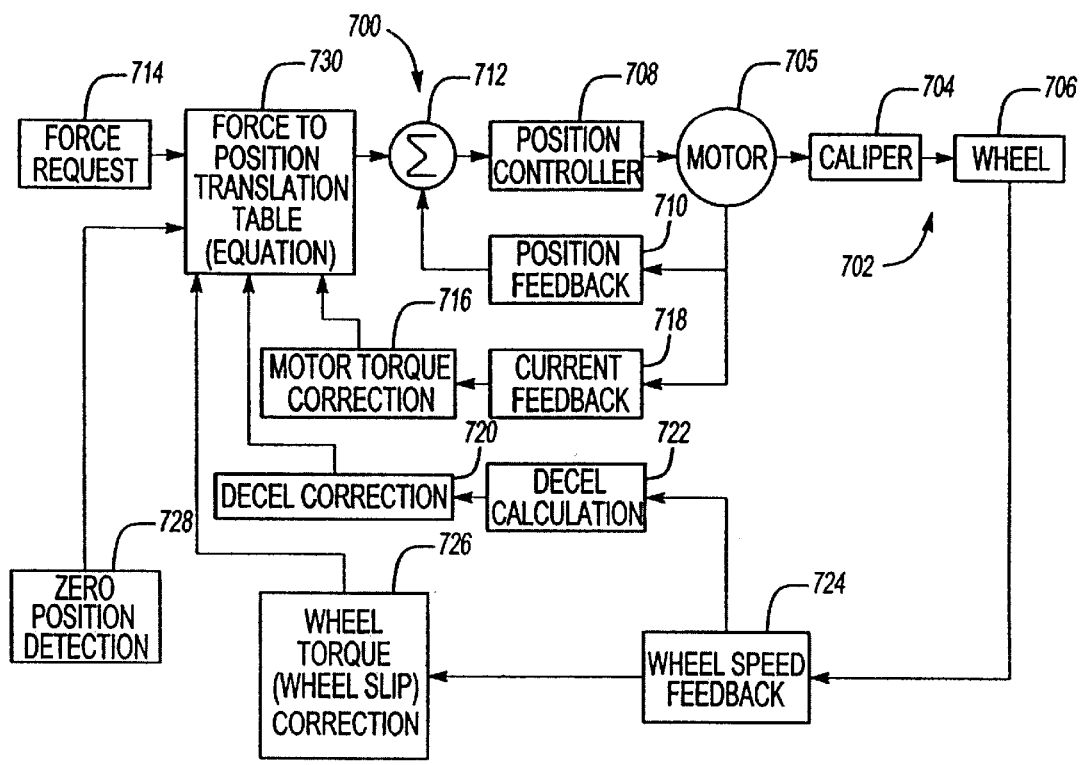
FIG. 7 is a diagram of a position control to estimate caliper force control; and, FIG. 8 is a flow diagram of a deceleration calibration routine of the present invention.

With reference to FIG. 7, a position control 700 for a brake system 702 comprising a brake caliper 704 and a motor 705 coupled to a wheel 706, is shown. The control 700 includes a position controller 708, a position feedback 710, and a sixth summer 712 for providing position control of the caliper 704. Input in the form of a force request 714 is provided by a driver operated input device (not shown) such as a brake pedal.

Motor torque correction 716 is provided using motor current feedback 718. Deceleration correction 720 is provided using a deceleration calculation 722 based on wheel speed feedback 724. The wheel speed feedback 724 is also utilized by a wheel torque/wheel slip correction 726. The motor torque correction 716, deceleration correction 720, wheel torque/wheel slip correction 726, and a zero position detection 728 are translated into a modified force request via a translation table or equation 730 (see FIGS. 4, 6, and 7 and below). Use of wheel speed correction in a brake system is disclosed in U.S. Pat. No. 5,539,641 which was issued to Deron C. Littlejohn on Jul. 23, 1996 and is hereby incorporated by reference.

Figure 4:
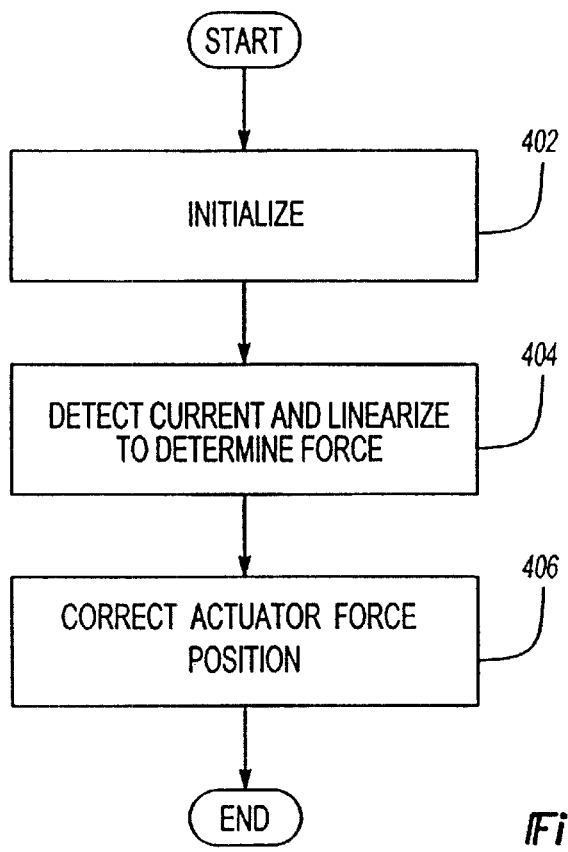
FIG. 4 is a flow diagram of the operation of the controller of FIG. 1, according to an embodiment of the present invention.

With reference to FIG. 4, the sensing means 112 utilizes the current and position sensors 114 as an indication of brake force. Current is directly related to clamp force and therefore indirectly with actuator position.

Figure 5:
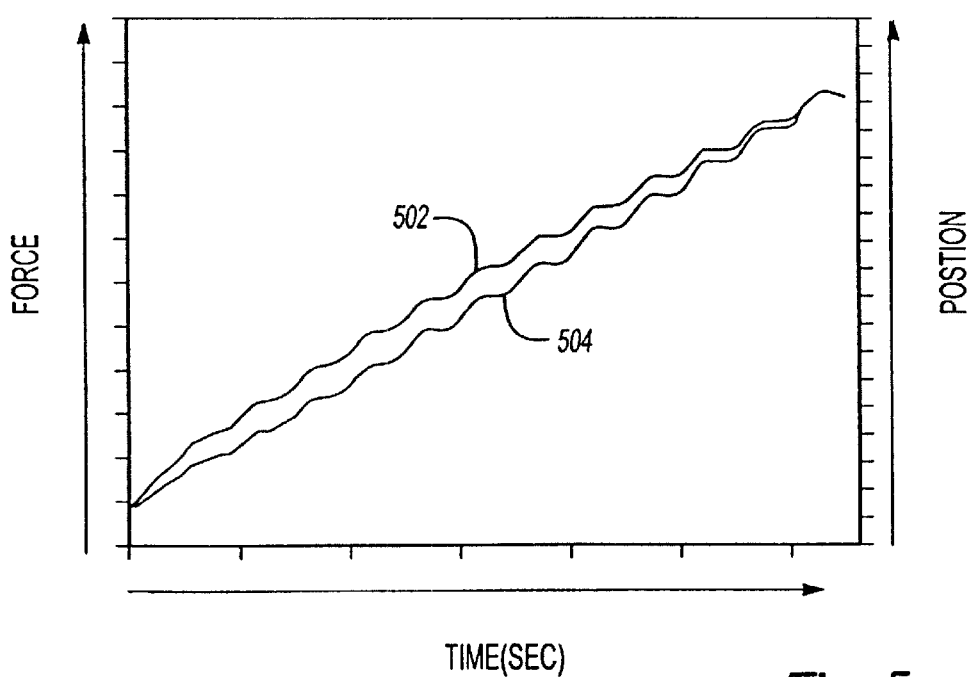
FIG. 5 is a chart illustrating the relationship between a position and force for a given brake actuator.

With reference to FIG. 5, a chart illustrating brake caliper position 502 and brake force 504 for a given brake caliper is shown during brake engagement. At time, t=0, the brake caliper 110 is in the initial position. The initial position $\Theta$ is defined as the position of the brake caliper where brake engagement starts. As shown, there is a non-linear relationship between position and force (for brake engagement and brake release). For a given actuator 102, the relationship between position and force must be experimentally derived and preferably modeled using a mathematical equation. For example, in one embodiment, the relationship between position and force is modeled using a quadratic equation, i.e., $Ax^2$ and $Bx$ and $C$.

Returning to FIG. 4, in a first flow diagram block 402 the controller 100 is initialized or calibrated, e.g., at engine start up, to determine the initial position Θ (see below). In a second flow diagram block 404 during operation, the position of the actuator 112 is detected. Using the mathematical equation, the brake force is determined as a function of the detected position. In a third flow diagram block 406, actuator force is corrected using a predetermined translation equation or table, i.e., modifying the translation table or equation 730.

Figure 6:
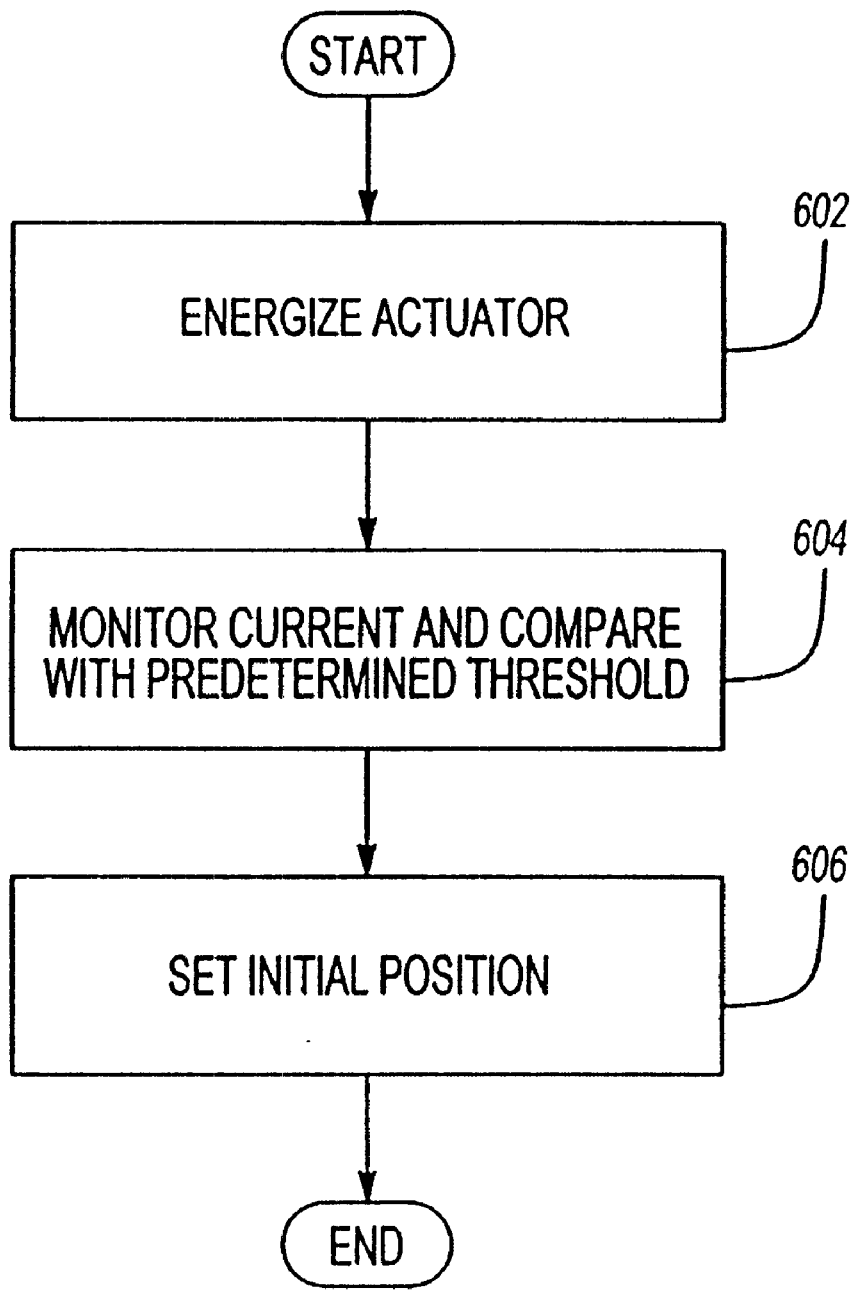
FIG. 6 is a flow diagram of a calibration routine of the present invention.

With reference to FIG. 6, the controller 100 is calibrated at engine start-up and/or on an as needed or periodic basis (while the engine is running and vehicle is stopped) to detect the initial or zero position (zero position detection 728). In a fourth flow diagram block 602, the actuator 102 is energized using a low current limit. The actuator position and current are monitored The current is compared with a predetermined threshold in a fifth flow diagram block 604. The initial position Θ is detected and set when the current reaches the predetermined threshold in a sixth flow diagram block 606. This initial position Θ is defined by the amount of time the actuator 102 is energized to reach the initial position.

Figure 8:
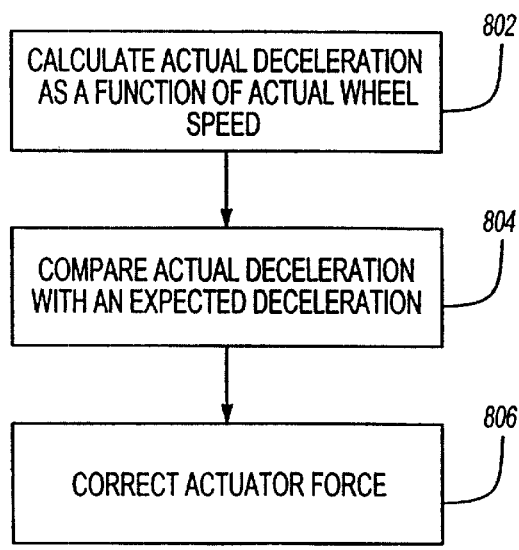

With reference to FIG. 8, the controller 100 is calibrated as a function of vehicle deceleration. In a seventh flow diagram block 802, an actual deceleration value is calculated as a function of actual wheel speed. In eighth flow diagram block 804, the actual deceleration value is compared with an expected deceleration value from the force to position translation 730. In a ninth flow diagram block 806, actuator force is corrected using a predetermined translation equation or table, i.e., modifying the translation table or equation 730 as a function of the difference between the actual deceleration value and the expected deceleration value.

Vehicle dynamics affect brake actuation. For example, brake pads exhibit wear which changes the initial position. Preferably, the current detected by the sensor 114 is monitored to detect the need for re-calibration. If the detected current is above or equal to a predetermined threshold then the initial position has changed due to brake wear and the sensing means needs to be re-calibrated.

Other parameters, such as temperature, will also affect the braking system. Wheel slip is an indication of wheel torque. The present invention is adapted to determine wheel slip and modify the calculation of force feedback as a function thereof.

Wheel slip is determined as a percentage of the difference between vehicle speed and wheel speed. Vehicle speed and wheel speed are detected by sensors (not shown) in a manner well known in the art. Vehicle speed and wheel speed differ due to tire deformation.

In one embodiment, wheel slip is determined by subtracting wheel speed at one wheel from the determined vehicle speed and dividing by the vehicle speed. Other determinations of wheel slip may also be used.

Wheel slip is a percentage. For a given percentage or range of percentages, the linearization of actuator position to determine brake force is modified. For example, if a quadratic equation is used, the constants A, B, C may be modified for different ranges of wheel slip. Additionally, a different equation may be used for different ranges of wheel slip.

In summary, the present invention provides a combined saturated and small signal actuator controller 100. The controller 100 senses current supplied to the actuator 102 and calculates brake force as a function thereof.

With this invention has been described in reference to the illustrated embodiment, it will be understood that various modifications and design variations will occur to those skilled in the art, and that controls incorporating such modifications may fall within the scope of this invention, which is defined by the appended claims.

What is claimed is:

1. A controller for controlling an actuator in response to an input signal, comprising:

sensing means for detecting a position of the actuator, calculating a force applied to the actuator as a function of the detected position using a predetermined formula, and responsively producing a force feedback signal; and, a control block adapted to receive the input signal and the force feedback signal, detect an operating condition of the input signal, and responsively deliver to the actuator a control signal, wherein the control signal is a small signal control if the operating condition is equal to a small signal mode and the control signal is a saturation control signal if the operating condition is equal to a saturated mode.

2. A controller, as set forth in claim 1, wherein the sensing means is adapted to initialize by energizing the actuator, monitoring current supplied to the actuator and responsively detecting actuator engagement and setting an initial position.

3. A controller, as set forth in claim 2, wherein the sensing means is adapted to detect actuator engagement by comparing detected current with a predetermined threshold.

4. A controller, as set forth in claim 1, wherein the predetermined formula is experimentally derived.

5. A controller, as set forth in claim 1, wherein the predetermined formula is a quadratic equation.

6. A controller, as set forth in claim 1, wherein the sensing means is adapted to continuously monitor current applied to the actuator and responsively detect actuator wear.

7. A controller, as set forth in claim 6, wherein the sensing means detects actuator wear by comparing detected current with a known curve.

8. A controller, as set forth in claim 6, wherein the sensing means is adapted to re-calibrate in response to detecting actuator wear.

9. A controller, as set forth in claim 1, wherein the sensing means is adapted to determine wheel slip and responsively modify the predetermined equation.

10. A controller for controlling an actuator in response to an input signal, comprising:

sensing means for detecting a position of the actuator, calculating a force applied to the actuator as a function of the detected position using a predetermined formula, and responsively producing a force feedback signal;

a first control block for receiving the input signal, detecting an operating condition of the input signal, and responsively producing an operating condition signal, wherein the operating condition signal has a first value if the operating condition of the input signal is in a small signal mode and a second value if the operating condition of the input signal is in a saturated mode; and, a second control block having a small signal portion and a saturation portion, the second control block adapted to receive the input signal, the force feedback signal and the operating condition signal and responsively deliver to the actuator a control signal, the small signal portion and the saturation portion adapted to produce a small signal control signal and a saturation control signal, respectively, as a function of the input signal, wherein the control signal is equal to the small signal control signal if the operating condition signal is equal to the first value and is equal to the saturation control signal if the operation condition signal is equal to the second value.

11. A controller for controlling a brake caliper for a brake system of a motor vehicle in response to an input signal, comprising:

sensing means for detecting a position of the actuator, calculating a force applied to the actuator as a function of the detected position using a predetermined formula, and responsively producing a force feedback signal;

a first control block for receiving the input signal, detecting an operating condition of the input signal, and responsively producing an operating condition signal, wherein the operating condition signal has a first value if the operating condition of the input signal is in a small signal mode and a second value if the operating condition of the input signal is in a saturated mode; and, a second control block having a small signal portion and a saturation portion, the second control block adapted to receive the input signal, the force feedback signal and the operating condition signal and responsively deliver to the brake caliper a control signal, the small signal portion and the saturation portion adapted to produce a small signal control signal and a saturation control signal, respectively, as a function of the input signal, wherein the control signal is equal to the small signal control signal if the operating condition signal is equal to the first value and is equal to the saturation control signal if the operation condition signal is equal to the second value.

12. A method for controlling an actuator in response to an input signal, comprising:

detecting position of the actuator;

detecting an operating condition of the input signal;

calculating a force as a function of the detected position using a predetermined formula, and responsively producing a force feedback signal; and, receiving the input signal and the force feedback signal and responsively delivering to the actuator a control signal, wherein the control signal is a small control signal if the operating condition is equal to a small signal mode and the control signal is a saturation control signal if the operating condition is equal to a saturated mode.

13. A method, as set forth in claim 12, including the steps of:

initialize by energizing the actuator;

monitoring current supplied to the actuator; and, responsively detecting actuator engagement and setting an initial position.

14. A method, as set forth in claim 13, including the step of detecting actuator engagement by comparing detected current with a predetermined threshold.

15. A method, as set forth in claim 12, wherein the predetermined formula is experimentally derived.

16. A method, as set forth in claim 12, wherein the predetermined formula is a quadratic equation.

17. A method, as set forth in claim 12, including the steps of:

monitoring current applied to the actuator; and, responsively detecting actuator wear.

18. A method, as set forth in claim 17, wherein the step of detecting actuator wear includes the step of comparing detected current with a known curve.

19. A method, as set forth in claim 17, including the step of re-calibrating in response to detecting actuator wear.

20. A controller, as set forth in claim 12, including the step of determining wheel slip and responsively modifying the predetermined equation.

* * * * *